United States Patent [19]

Hatsuyama

[11] Patent Number: 4,828,069
[45] Date of Patent: May 9, 1989

[54] MOTORCYCLE

[75] Inventor: Ikuo Hatsuyama, Saitama, Japan

[73] Assignee: Honda Giken Kogyo Kabushiki Kaisha, Tokyo, Japan

[21] Appl. No.: 15,448

[22] Filed: Feb. 17, 1987

[30] Foreign Application Priority Data

Feb. 18, 1986 [JP] Japan ................................ 61-31975
Feb. 18, 1986 [JP] Japan ................................ 61-31976

[51] Int. Cl.⁴ .......................................... B62K 25/04
[52] U.S. Cl. ................................. 180/219; 280/275; 280/277; 280/279
[58] Field of Search ............... 180/219; 280/275, 276, 280/277, 279

[56] References Cited

U.S. PATENT DOCUMENTS

| | | | |
|---|---|---|---|
| 3,521,904 | 7/1970 | Sheffer | 280/270 |
| 3,642,083 | 2/1972 | Rodler, Jr. | 180/224 |
| 3,971,571 | 7/1976 | Yoshioka | 280/277 X |
| 4,265,329 | 5/1981 | de Cortanze | 180/219 |
| 4,388,978 | 6/1983 | Flor | 180/219 |
| 4,526,249 | 7/1985 | Parker | 180/219 |
| 4,638,881 | 1/1987 | Morioka et al. | 180/219 |
| 4,700,799 | 10/1987 | Kawano | 180/219 |
| 4,721,179 | 1/1988 | Yamaguchi et al. | 180/219 |
| 4,723,620 | 2/1988 | Ono | 280/275 X |
| 4,723,785 | 2/1988 | Kawaguchi et al. | 280/275 |

FOREIGN PATENT DOCUMENTS

| | | |
|---|---|---|
| 2332169 | 6/1977 | France . |
| 53-142739 | 12/1978 | Japan ................................ 180/219 |
| 54-102739 | 8/1979 | Japan . |
| 57-15087 | 1/1982 | Japan . |
| 7805244 | 5/1977 | Netherlands . |
| 158616 | 1/1921 | United Kingdom ................ 280/276 |
| 1274441 | 5/1972 | United Kingdom . |

OTHER PUBLICATIONS

Apr. 1979 excerpt from Japanese Motor Cyclist magazine.

Primary Examiner—Charles A. Marmor
Assistant Examiner—Mitchell J. Hill
Attorney, Agent, or Firm—Irving M. Weiner; Joseph P. Carrier; Pamela S. Burt

[57] ABSTRACT

A motorcycle [1; 50] having a front wheel [23] and a rear wheel [5] includes a motorcycle body [4, 2] including an engine [2], the engine [2] having an engine body [6] and a cylinder [6] disposed on a rear portion of the engine body [6] to define a space [S] forwardly of the cylinder [7] and forwardly and upwardly of the engine body [6]. Upper and lower front swing arms [19, 20] extend horizontally and forwardly from the motorcycle body [4, 2] substantially parallel to each other, the front wheel [23] being operatively supported on front portions of the upper and lower front swing arms [19, 20]. The upper and lower front swing arms [19, 20] have rear portions [19a, 19b, 20a, 20b] pivotally mounted on the motorcycle body [4, 2] for vertical swinging movement with respect thereto. The rear portions [19a, 19b] of the upper front swing arm [19] are pivotally mounted on the motorcycle body [4, 2] within the space [S]. The rear portions [20a, 20b] of at least one of the upper and lower front swing arms [19, 20] are angularly movably mounted on a support shaft [22] extending transversely of the motorcycle, each of the opposite ends of the support shaft [22] being sandwiched between a portion [21] of the motorcycle body [4, 2] having an upper surface [41, 42] and a holder [43] attached to the upper surface [41, 42] of the portion [21].

13 Claims, 3 Drawing Sheets

MOTORCYCLE

BACKGROUND OF THE INVENTION

1. Field of the Invention

The present invention relates to a motorcycle, and more particularly to a motorcycle having a front wheel rotatably mounted on the front ends of upper and lower front swing arms extending horizontally and forwardly from a motorcycle body substantially parallel to each other.

2. Description of the Relevant Art

Many motorcycles have a front wheel supported by a telescopic front fork pivotally mounted on a head tube on a front, upper portion of the motorcycle frame.

Other motorcycles which do not employ the above suspension system, i.e., which have a front wheel rotatably mounted on the front ends of upper and lower front swing arms extending forwardly from a motorcycle body substantially horizontally are disclosed in U.S. Pat. No. 4,265,329 patented May 5, 1981 and U.S. Pat. No. 4,526,249 patented Jul. 2, 1985, for example.

In the former U.S. Patent, the rear ends of the respective front swing arms are pivotally mounted for vertical swinging movement on an engine unit that doubles as a motorcycle frame. Therefore, the disclosed motorcycle has a smaller overall weight and a lower center of gravity than those of conventional motorcycles which employ vehicle frames. In the latter U.S. Patent, the rear ends of the respective front swing arms are pivotally mounted for vertical swinging movement on the downtubes of a motorcycle frame. The front swing arms have front ends pivotally mounted by respective ball joints on the upper and lower ends of a kingpin on which the front wheel is rotatably supported. The kingpin is are coupled to a front wheel steering mechanism and angularly movable about an axis interconnecting the ball joints for steering the front wheel. The axis is inclined to a vertical line, forming therewith a caster angle of the front wheel. When the motorcycle is viewed in side elevation, the front swing arms cooperate with a portion of an engine unit which joins the rear pivot points of the front swing arms and also with portions of the knuckles which join the front pivot points of the front swing arms, in forming a parallelogram. The angle at which the above axis is inclined to the vertical line remains unchanged even when the swing arms are vertically swung about the rear pivot points thereof. Therefore, the caster angle of the front wheels remain constant at all times.

In each of the conventional motorcycles disclosed in the above U.S. Patents, the engine cylinders project forwardly and upwardly from a front, upper portion of the engine body. Therefore, the rear portion of the upper swing arm is required to be arranged out of physical interference with the engine cylinders and exhaust pipes extending from front portions of the engine cylinders. As a result, the position where the rear end of the upper swing arm is pivotally coupled to the vehicle body cannot be selected with a large degree of freedom or flexibility, and the pivot point of the upper swing arm and the upper swing arm itself are complex in structure. This leads to another problem in that the pivot point of the front lower swing arm and the lower swing arm itself are also complex in structure. If a frame member were attached to a front portion of the engine unit and the rear end of the upper swing arm were pivoted to such a frame member in the motorcycle disclosed in the former U.S. Patent, then the rear pivot point of the upper swing arm could be positioned more freely. However, the upper swing arm would require a certain minimum length in order to allow the front wheel to move vertically. Therefore, if a frame member were installed on the engine unit, the wheel base would be increased. Such a problem manifests itself in the motorcycle of the latter U.S. Patent because it has steering link mechanism in the shape of a parallelogram as described above.

The present invention has been made in an effort to eliminate the aforesaid drawbacks of the motorcycles in which a front wheel is rotatably mounted on the front ends of upper and lower front swing arms extending horizontally and forwardly from a motorcycle body substantially parallel to each other.

SUMMARY OF THE INVENTION

It is an object of the present invention to provide a motorcycle of the type having having a front wheel rotatably mounted on the front ends of upper and lower front swing arms extending horizontally and forwardly from a motorcycle body substantially parallel to each other, with the position of the rear pivot point of the upper swing arm being selectable with increased freedom or flexibility.

Another object of the present invention is to provide a motorcycle of the type described above, having a simple structure by which the rear pivot points of the upper and lower front swing arms are attached in position.

To achieve the above objects, there is provided in accordance with the present invention a motorcycle having a front wheel and a rear wheel, comprising a motorcycle body, the motorcycle body including an engine; the engine having an engine body and a cylinder disposed on a rear portion of the engine body to define a space forwardly of the cylinder and forwardly and upwardly of the engine body; upper and lower front swing arms extending horizontally and forwardly from the motorcycle body substantially parallel to each other, the front wheel being operatively supported on front portions of the upper and lower front swing arms, the upper and lower front swing arms having rear portions pivotally mounted on the motorcycle body for vertical swinging movement with respect thereto; and the rear portions of the upper front swing arm being pivotally mounted on the motorcycle body within the space.

The rear portions of at least one of the upper and lower front swing arms are angularly movably mounted on a support shaft extending transversely of the motorcycle, each of the opposite ends of the support shaft being detachably sandwiched between a portion of the motorcycle body having an upper surface and a holder attached to the upper surface of the portion.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
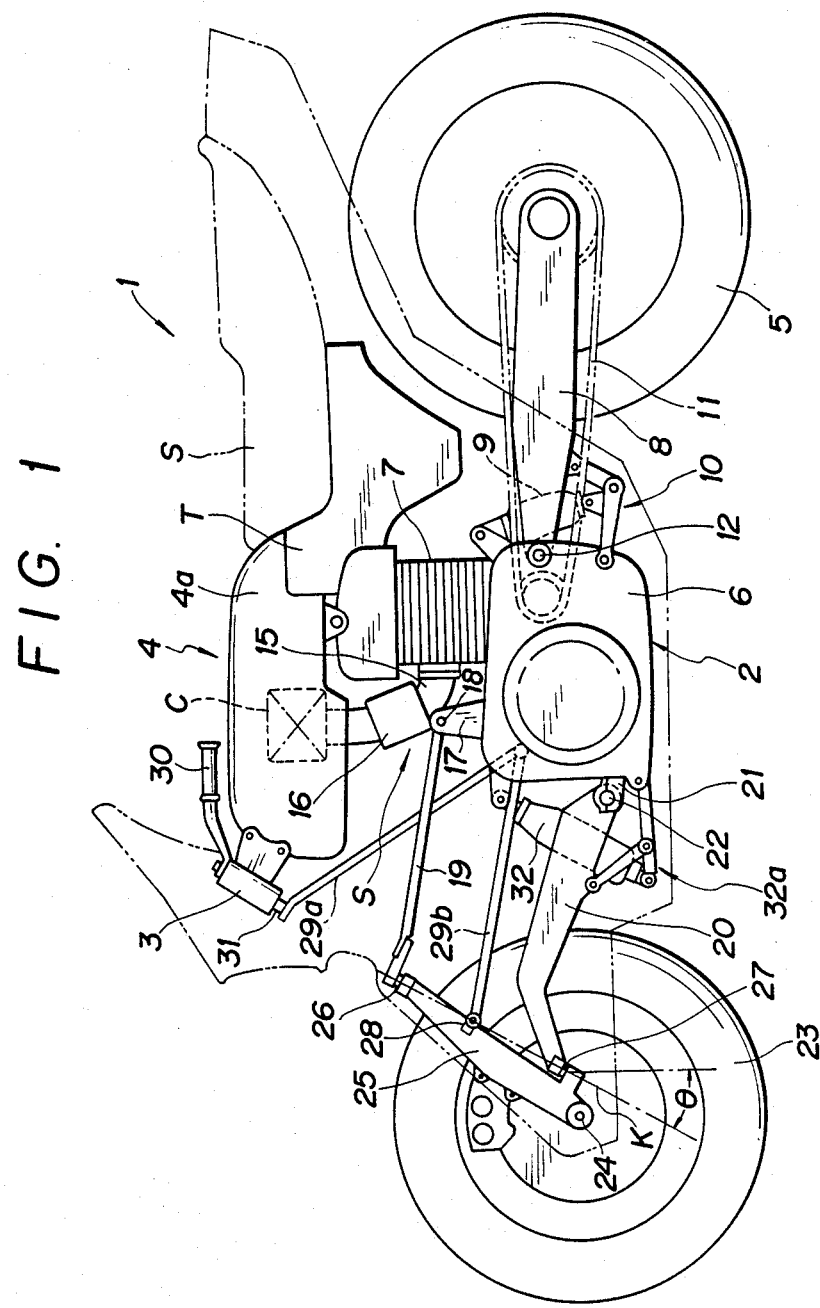
FIG. 1 is a side elevational view of a motorcycle according to a first embodiment of the present invention.

FIG. 1 shows a motorcycle, generally designated by the reference numeral 1, according to a first embodiment of the present invention. The motorcycle 1 includes a centrally located engine unit 2, a dummy tank 4a mounted on an upper portion of the engine unit 2, and a stem holder 3 mounted on a front portion of the dummy tank 4a. The dummy tank 4a and the engine unit 2 are coupled together as a rigid motorcycle body 4. An air cleaner C is housed in the dummy tank 4a. The engine unit 2 comprises a crankcase 6 serving as an engine body and a cylinder 7 erected or extending upwardly from a rear portion of the crankcase 6. The crankcase 6 accommodates a transmission and a clutch (not shown) in a front portion thereof. To the rear end of the crankcase 6, there is pivotally attached the front end of a rear fork 8 having a rear end on which a rear wheel 5 is rotatably supported. A damper or shock absorber 9 is coupled between the rear fork 8 and the crankcase 6 through a progressive link 10. The rear wheel 5 is driven by a drive chain 11 which is driven by the engine unit 2. Upper and lower front swing arms 19, 20 (described laeter) are pivotally mounted on a front portion of the engine unit 2.

Figure 2:
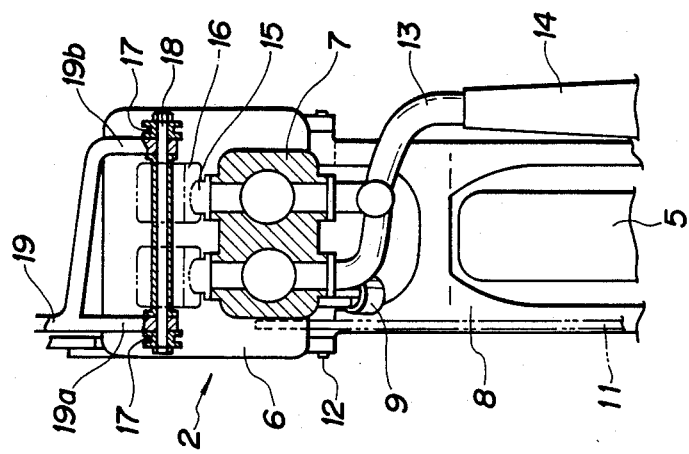
FIG. 2 is a fragmentary plan view of an engine unit of the motorcycle shown in FIG. 1.

As also illustrated in FIG. 2, the cylinder 7 is disposed in a rear portion of the engine unit 2. The upward direction in FIG. 2 corresponds to the forward direction of the motorcycle. An exhaust pipe 13 with a muffler 14 joined to the rear end thereof extends rearwardly from the rear portion of the cylinder 7. An intake pipe 15 is connected to the front portion of the cylinder 2 and extends upwardly for connection to the air cleaner C through a carburetor 16. A relatively large space S is defined forwardly of the cylinder 7, and upwardly of the crankcase 6 and rearwardly of a front end of the crankcase. The two brackets 17 are mounted upwardly on upper opposite sides of the crankcase 6 which face the space S. The upper front arm 19 has rear branches 19a, 19b spaced from each other and pivotally supported on the brackets 17 by a pivot shaft 18. As shown in FIG. 2, a lateral pivot span of the upper swing arm 19, which is defined by the branches 19a, 19b, is smaller than the lateral width of the crankcase 6. The upper front arm 19, the lower front arm 20, and a knuckle 25 (described later) jointly constitute a front wheel suspension device.

Figure 3:
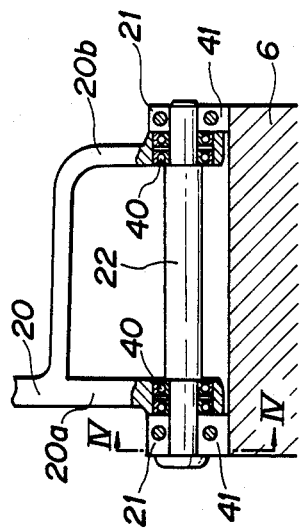
FIG. 3 is a fragmentary plan view, partly in cross section, of a lower front swing arm pivoted to the engine unit.

As shown in FIGS. 2 and 3, each of the upper and lower front arms 19, 20 is substantially in the shape of a "h" when viewed in plan. The upward direction in FIG. 3 also corresponds to the forward direction of the motorcycle. The arms 19, 20 each have two rear branches, while straight branches of the arms 19, 20 extend forwardly from the engine unit 2 on the lefthand side of the motorcycle as shown in FIGS. 2 and 3. A damper or shock absorber 32 is coupled between the lower front arm 20 and the crankcase 6 through a progressive link 32a and is positioned between the two branches 20a, 20b of the lower front arm 20. A support shaft 22 extends through the rear ends of the branches 20a, 20b with bearings 40 disposed respectively therebetween. The lower front arm 20 is thus angularly movably mounted on the support shaft 22. The support shaft 20 has opposite outer ends projecting laterally beyond the respective bearings 40.

Figure 4:
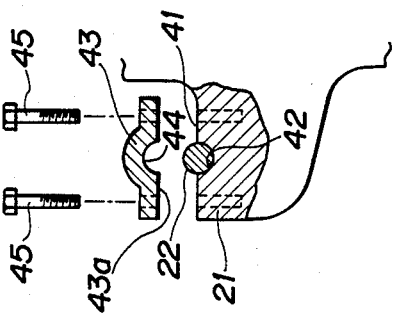
FIG. 4 is an exploded cross-sectional view taken along line IV—IV of FIG. 3.

A pair of brackets 21 integrally projects from a front and lower portions of the crankcase 6. As shown in FIG. 4, each of the brackets 21 has a horizontal upper surface 41. The lower half of one of the outer ends of the support shaft 22 is received in a semicircular recess 42 defined centrally in the upper surface 41 in the longitudinal direction of the motorcycle 1 and having its axis directed transversely of the motorcycle. Each outer end of the support shaft 22 is detachably sandwiched between the bracket 21 and a holder 43 which is fastened to the bracket 21 by a pair of bolts. The holder 43 has a horizontal lower surface 43a held in intimate contact with the horizontal upper surface 41. The horizontal lower surface 43a has a semicircular recess 44 defined centrally therein in the longitudinal direction of the motorcycle 1 and having its axis directed transversely of the motorcycle. 1. The upper half of the outer end of the support shaft 22 being fitted in the recess 44. The recesses 42, 44 have radii of curvature that are substantially the same as the radius of curvature of each outer end of the support shaft 22.

The upper and lower front arms 19, 20 extend forwardly and horizontally from the brackets 17, 21, respectively, and substantially parallel to each other in side elevation. The knuckle 25, on which a front wheel 23 is rotatably supported by an axle 24, is steerably pivoted on the front ends of the upper and lower front arms 19, 20. The front end of the upper front arm 19 is pivotally coupled by a ball joint 26 to the upper end of the knuckle 25. The front end of the lower front arm 20 is pivotally coupled by a ball joint 27 to the lower end of the knuckle 25. The knuckle 25 is angularly movable about an axis K passing through the ball joints 26, 27. The arms 19, 20 are vertically angularly movable through a certain angle with respect to the knuckle 25. The axis K is inclined at an angle $\theta$ to the vertical line when viewed in side elevation, the angle $\theta$ being the caster angle of the front wheel 23. The front wheel 23 is steered as the knuckle 25 turns about the axis K. A knuckle arm 28 projects laterally from a substantially vertically intermediate portion of the knuckle 25, and is pivotally joined to the front end of lower steering link 29b. An angle piece (not shown) having an upward member and a lateral member is attached to a portion of the crankcase 6 such that the angle piece can be angularly moved about the upward member thereof. The rear end of the lower steering link 29b is pivoted to the outer end of the lateral member of the angle piece so that the rear end of the lower steering link 29b is vertically swingable. The upper end of the upward member of the angle piece is pivoted to the lower end of an upper steering arm 29a through a universal joint (not shown). The upper end of the upper steering arm 29a is coupled via a universal joint to the lower end of a steering stem 31 extending through the stem holder 3, the steering stem 31 being angularly movable by a handlebar 30. When the handlebar 30 is turned, the upper steering arm 29a is turned about its own axis. In response to the turning movement of the upper steering arm 29a, the lateral member of the angle piece is swung back and forth about the upward member thereof, for thereby causing the lower steering link 29b to move linearly back and forth. Therefore, the knuckle 25 is turned about the axis K. The lower swing arm 20 has an intermediate portion curved to the left out of physical interference with the front wheel 23 as it is steered.

The swing arms 19, 20 are pivotally mounted for vertical swinging movement on the engine unit 2 at their rear ends 19a, 19b, 20a, 20b, and extend horizontally and forwardly from the engine unit 2 substantially parallel to each other. The rear pivot points of shafts 18, 22 and the swing arms 19, 20 and the ball joints 27, 26 are interconnected by straight lines which jointly form a parallelogram 18-22-27-26. Therefore, the caster angle $\theta$ remains the same even when the swing arms 19, 20 vertically swing about the rear pivot points upon vertical movement of the front wheel 23. The vertical movement of the swig arms 19, 20 is dampened by the damper 32.

Since the cylinder 7 projects upwardly from the rear portion of the crankcase 6, the relatively large space S is defined forwardly of the cylinder 7 and forwardly and upwardly of the crankcase 6. The rear portion of the upper front arm 19 is disposed in the space S. Therefore, the position where the rear pivot point of the upper arm 19 is located can be selected with a large degree of freedom, with the result that the front wheel suspension system can also be designed with a large degree of freedom. The brackets 17 to which the rear ends of the upper arm 19 are pivotally attached are spaced considerably rearwardly from the front face of the crankcase 6. Consequently, the wheel base of the motorcycle 1 is not required to be unduly increased as it would in conventional motorcycle designs, notwithstanding the fact that the front wheel arms 23 is supported on the front ends of the front arms 19, 20, having certain minimums lengths, which extend forwardly from the engine unit 2 serving as a portion of a motor vehicle motorvehicle body frame.

The support shaft 22 on which the rear ends 20a, 20b of the lower swing arm 20 are pivotally supported is detachably secured to the eingine unit 2 by being clamped beween the brackets 21 and the holders 43 fastened to the brackets 21, respectively. When attaching the lower arm 20 to the engine unit 2, the lower arm 20 is brought rearwardly toward the brackets 21 until the support shaft 22 is placed in the recesses 42. Then, the holders 43 are placed on the brackets 21, and fastened thereto by the bolts 45. Accordingly, the lower arm 20 can be quite easily installed on the body frame. It is possible to install the lower arm 20 with the front wheel 23 already mounted thereon. Conversely, the lower arm 20 can be detached from the body frame by simply unfastening the bolts 45 and removing the holders 43. As a consequence, the lower arm 20 can also be quite easily dismounted from the body frame.

In the above embodiment, the front arms 19, 20 are directly pivotally attached to the engine unit 2. However, the principles of the present invention are also applicable to a motorcycle in which upper and lower front arms extend forwardly from a body frame. Further, the structure of the invention by which the rear ends of the lower front swing arm 20 are attached to the engine unit 2, as shown in FIG. 3, may be incorporated in a motorcycle in which an engine cylinder is disposed on a front portion of the engine.

As shown in FIG. 2, the structure by which the upper front swing arm 19 is attached to the brackets 17 is different from the structure shown in FIG. 3. However, the structure of FIG. 2 could alternatively be the same as the structure of FIG. 3.

Figure 5:
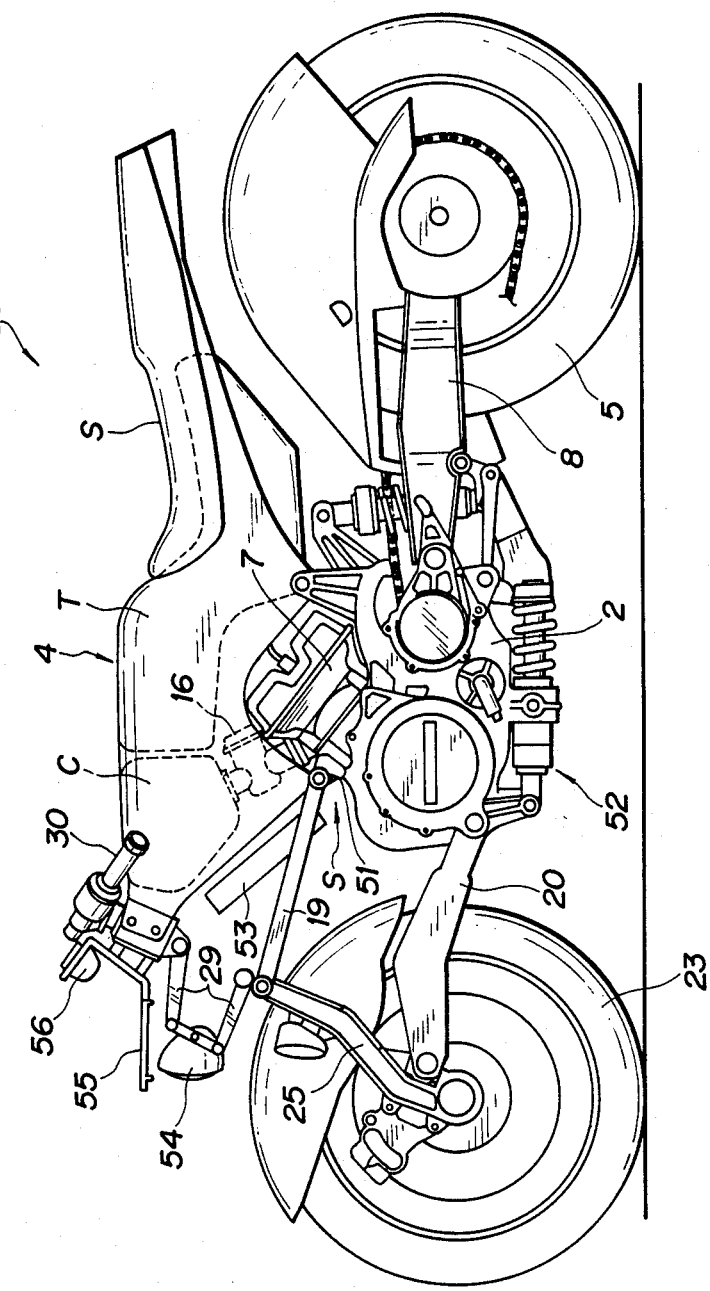
FIG. 5 is a side elevational view of a motorcycle according to a second embodiment of the present invention.

FIG. 5 shows a motorcycle 50 constructed in accordance with a second embodiment of the present invention. Those components in FIG. 5 which are identical to those of the first embodiment are denoted by identical reference characters, and will not be described in detail. In the motorcycle 50, the engine cylinder 7 is inclined rearwardly, defining a relatively large space S in front of the same. The rear end of the upper swing arm 19 is pivoted to a boss 51 on the front face of the cylinder 7. A front damper 52 is disposed below the engine unit 2. Designated at 53 is a radiator, 54 a head lamp, 55 a rack, and 56 gauges meters. The motorcycle 50 is as advantageous as the motorcycle 1 shown in FIG. 1.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motorcycle having a front wheel and a rear wheel, comprising:
  a motorcycle body, said motorcycle body including a engine;
  said engine havig an engine body and at least one cylinder disposed on a rear portion of said engine body to define a space forwardly of said cylinder, upwardly of said engine body rearwardly of a front end of said body and below an upper surface of said cylinder;
  upper and lower front swing arms extending horizontally and forwardly from said motorcycle body substantially parallel to each other, said front wheel being operatively supported on front portions of said upper and lower front swing arms, each of said upper and lower front swing arms having at least one rear portion pivotally mounted on said motorcycle body for vertical swinging movement with respect thereto; and
  said at least one rear portion of said upper front swing arm being pivotally mounted on said motorcycle body within said space.

2. A motorcycle according to claim 1, wherein said rear portions of said upper and lower front swing arms are pivotally mounted for vertical swinging movement on said engine.

3. A motorcycle according to claim 2, wherein said at least one rear portion of said upper front swing arm is pivotally mounted on portions of said engine body at an upper surface thereof which faces said space.

4. A motorcycle according to claim 3, wherein said portions of said engine body are spaced considerably rearwardly from a front surface of said engine body.

5. A motorcycle according to claim 3, wherein said engine includes an exhaust pipe extending rearwardly from a rear portion of said cylinder.

6. A motorcycle according to claim 2, wherein said cylinder is erected upwardly from said engine body.

7. A motorcycle according to claim 2, wherein said cylinder is inclined rearwardly from said engine body.

8. A motorcycle according to claim 1, further including a knuckle by which said front wheel is rotatably supported, said knuckle being pivotally mounted on the front portions of said upper and lower front swing arms, said rear portions of said upper and lower front swing arms being pivotally mounted on said motorcycle body at rear pivot points, respectively, said front portions of said upper and lower front swing arms being pivotally mounted on said knuckle at front pivot points, respectively, said front and rear pivot points being interconnected by lines which jointly form a parallelogram when viewed in side elevation.

9. A motorcycle according to claim 1, wherein said at least one rear portion of at least one of said upper and lower front swing arms is angularly movably mounted on a support shaft extending transversely of the motorcycle, each of the opposite ends of said support shaft being detachably sandwiched between a portion of said motorcycle body having an upper surface and respective holders attached to said upper surface of said portion.

10. A motorcycle according to claim 9, wherein said upper surface of said portion of said motorcycle body has a recess receiving a lower portion of said support shaft, said holder having a lower surface with a recess defined therein supporting an upper portion of said support shaft.

11. A motorcycle according to claim 10, wherein said upper surface and said lower surface lie horizontally.

12. A motorcycle having a front wheel and a rear wheel, comprising:
a motorcycle body, said motorcycle body including an engine;
said engine having a crankcase and at least one cylinder disposed on a rear portion of said crankcase to define a space forwardly of said cylinder, upwardly of said crankcase, rearwardly of a front end of said crankcase and below an upper surface of said cylinder;
upper and lower front swing arms extending horizontally and forwardly from said crankcase substantially parallel to each other, said front wheel being operatively supported on front portions of said upper and lower front swing arms, each of said upper and lower front swing arms having at least one rear portion pivotally mounted on said crankcase for vertical swinging movement with respect thereto; and
said at least one rear portion of said upper front swing arm being pivotally mounted on said crankcase within said space with a lateral pivot span which is smaller than a later width of said crankcase.

13. A motorcycle having a front wheel and rear wheel, comprising:
a motorcycle body, said motorcycle body including an engine;
said engine having a crankcase and at least one cylinder disposed on a rear portion of said crankcase to define a space forwardly of said cylinder, upwardly of said crankcase, rearwardly of a front end of said crankcase and below an upper surface of said cylinder;
upper and lower front swing arms extending horizontally and forwardly from said crankcase substantially parallel to each other, said front wheel being operatively supported on front portions of said upper and lower front swing arms, each of said upper and lower front swing arms having at least one rear portion pivotally mounted on said crankcase for vertical swinging movement with respect thereto;
said at least one rear portion of said upper front swing arm being pivotally mounted on said crankcase within said space; and
said crankcase being integrally formed with brackets for supporting said at least one rear portion of said upper front swing arm and said at least one rear portion of said lower front swing arm, respectively.

* * * * *

UNITED STATES PATENT AND TRADEMARK OFFICE
CERTIFICATE OF CORRECTION

PATENT NO. : 4,828,069  
DATED : May 9, 1989  
INVENTOR(S) : Ikuo Hatsuyama

Page 1 of 2

It is certified that error appears in the above-identified patent and that said Letters Patent is hereby corrected as shown below:

```
Column 1, line 35, delete "are";
          line 49, change "remain" to --remains--.
Column 2, line 8, before "steering" insert --a--;
          line 19, delete "having" (second occurrence).
Column 3, line 33, correct the spelling of "later";
          line 44, delete "and";
          line 58, change "a" to --an--.
Column 4, line 5, change "20" to --22--;
          line 7, after "from" delete "a";
          line 14, after "motorcycle" insert --1--;
          line 23, before "1" delete the period;
          line 24, change "being" to --is--.
Column 5, line 16, change "swig" to --swing--;
          line 33, delete "arms";
          line 37, delete "motorvehicle";
          line 41, correct the spelling of "engine";
          line 42, change "beween" to --between--.
Column 6, line 14, delete "meters";
          line 29 (Claim 1, line 3), after "including" change "a" to --an--;
          line 31 (Claim 1, line 5), change "havig" to --having--;
          line 34 (Claim 1, line 8), after "body" insert a comma.
```

UNITED STATES PATENT AND TRADEMARK OFFICE
CERTIFICATE OF CORRECTION

PATENT NO. : 4,828,069

DATED : May 9, 1989

INVENTOR(S) : Ikuo Hatsuyama

It is certified that error appears in the above-identified patent and that said Letters Patent is hereby corrected as shown below:

Column 8, line 11 (Claim 12, line 23), change "later" to -- lateral --.

Signed and Sealed this

Thirtieth Day of January, 1990

Attest:

JEFFREY M. SAMUELS

*Attesting Officer*     *Acting Commissioner of Patents and Trademarks*